United States Patent

[11] 3,573,340

| [72] | Inventors | Nicola Palmieri;<br>Vittorio Buroni, Milan, Italy |
|---|---|---|
| [21] | Appl. No. | 795,287 |
| [22] | Filed | Jan. 30, 1969 |
| [45] | Patented | Apr. 6, 1971 |
| [73] | Assignee | Pirelli Societa per Azioni<br>Milan, Italy |
| [32] | | Jan. 10, 1968 |
| [33] | | Italy |
| [31] | | 12,639A/68 |

[54] SEALED FLUID CABLE END WITH RELEASABLE VALVE PARTICULARLY FOR TERMINAL DEVICES DISPOSED IN NON-ACCESSIBLE AMBIENTS AND METHOD OF INSTALLING SAME
20 Claims, 3 Drawing Figs.

[52] U.S. Cl. .................................................... 174/20,
29/428, 174/18
[51] Int. Cl. ....................................................... H02g 15/22
[50] Field of Search........................................... 174/10,
11.3, 18, 19, 20, 22, 31; 29/592, 631, 428

[56] References Cited
UNITED STATES PATENTS

| 1,919,935 | 7/1933 | Eby.............................. | 174/20 |
| 2,015,542 | 9/1935 | Zeiss............................. | 174/22 |
| 2,049,835 | 8/1936 | Emanueli..................... | 174/10 |
| 2,647,939 | 8/1953 | Paluev.......................... | 174/18 |

FOREIGN PATENTS

| 575,058 | 2/1946 | Great Britain................ | 174/18 |

Primary Examiner—Laramie E. Askin
Attorney—Ward, McElhannon, Brooks & Fitzpatrick ABSTRACT: Oil-filled cable end and end terminal device therefor for entry into an accessory or apparatus of the closed type; means are provided enclosing cable end for preventing oil leakage from exposed insulation; means are also provided covering the oil duct in the cable end for normally preventing fluid flow therefrom, and for allowing fluid flow when the end terminal device is completely positioned within the accessory or apparatus of the closed type.

INVENTORS
NICOLA PALMIERI
BY VITTORIO BURONI

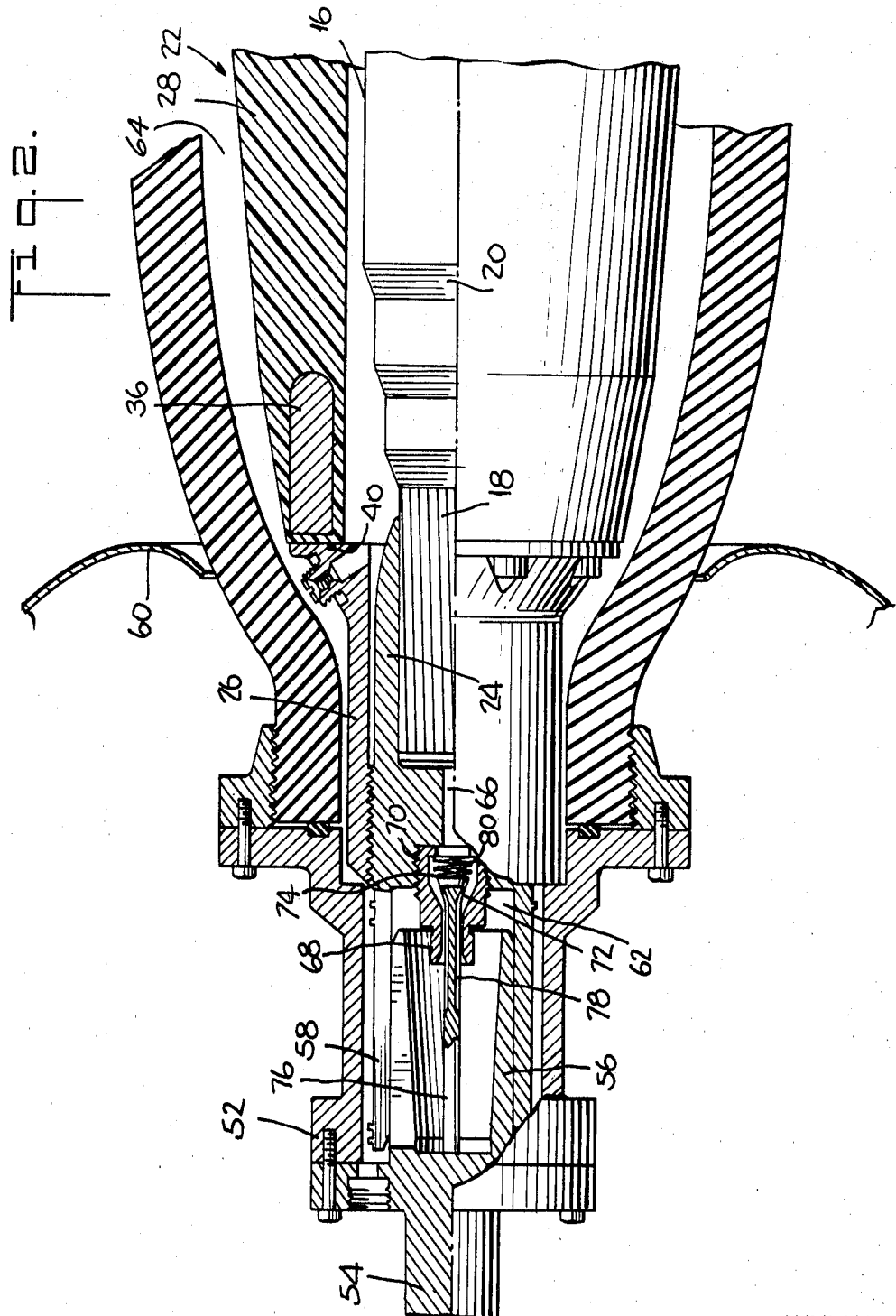

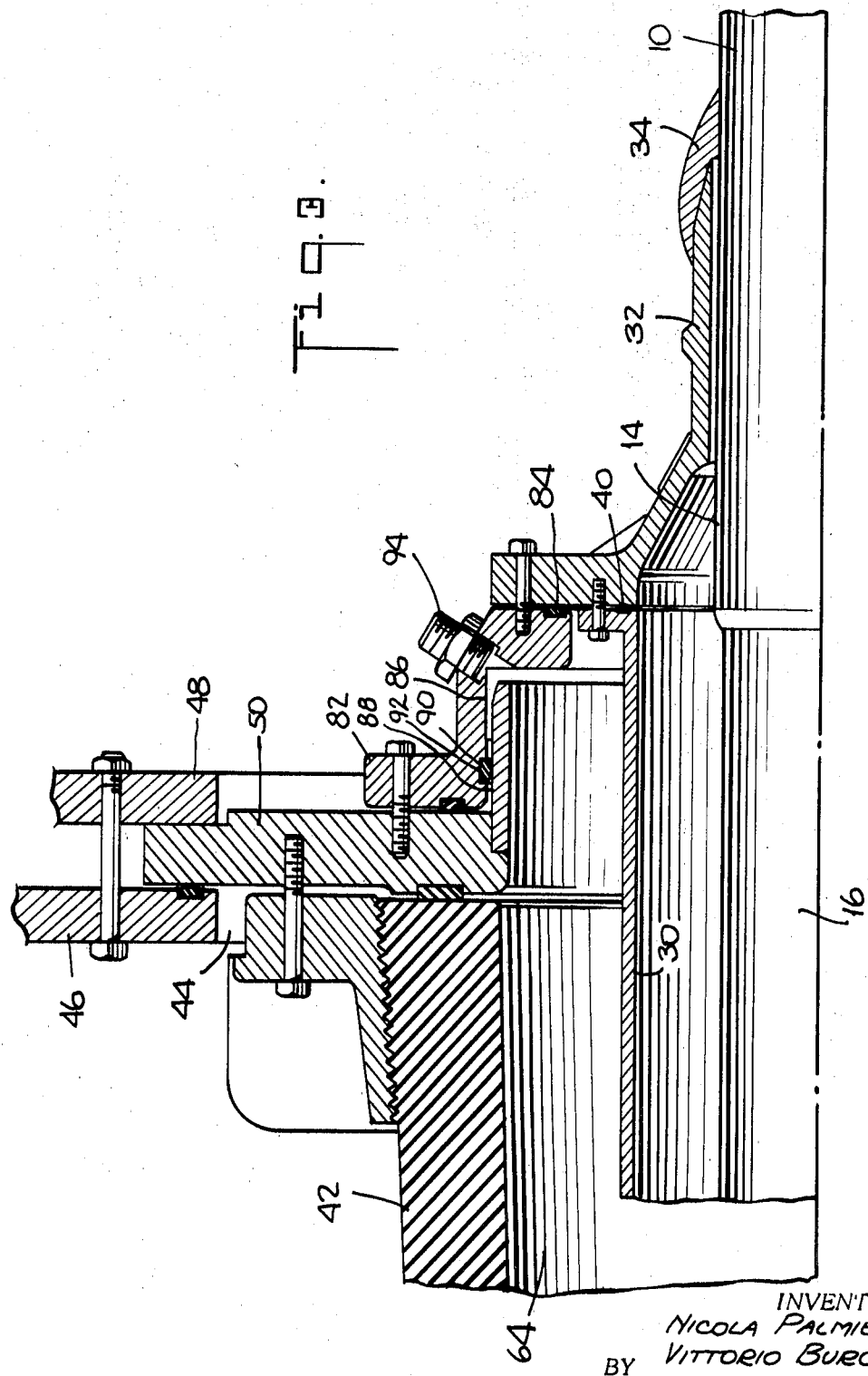

SEALED FLUID CABLE END WITH RELEASABLE VALVE PARTICULARLY FOR TERMINAL DEVICES DISPOSED IN NON-ACCESSIBLE AMBIENTS AND METHOD OF INSTALLING SAME

The present invention relates to oil-filled electric cable and, more particularly, it pertains to an end terminal device for ends of electric cable of the character described which is suitable for entry into an accessory or apparatus of the closed type.

In the present specification the expression "accessory or apparatus of the closed type" refers to an accessory or apparatus in which a terminated cable end, after its insertion in the accessory or apparatus, is surrounded by a tight ambient which is subsequently filled with an insulating fluid, such as, for example, the same insulating oil used in the oil duct of the terminated cable conductor. Thus, this expression includes cable stop joints and connections for entry into an apparatus contained within a closed casing filled with an insulating fluid, such as, for example, an electrical transformer.

An end terminal device according to the present invention is constructed in such a way that, when positioned on a prepared cable end and before its insertion in the accessory or apparatus of the closed type, oil leakage through bared insulation at the cable end is prevented, and oil spillage from the terminal end of the inner fluid duct of the cable conductor is precluded. An end terminal device providing these noted oil leakage preventive features permits easy and quick preparation of the cable end, and it is simply and expeditiously installed in an accessory or apparatus of the closed type since it can be easily positioned in the accessory or apparatus without need of further operation. Also, an end terminal device of the character described, permits the removal of the terminated cable end from the accessory or apparatus while maintaining the cable in completely impregnated condition and under oil pressure, and while keeping the housing, if any, of the accessory or apparatus at its normal pressure. This latter feature is of particular utility during any necessary periodic maintenance operations of the accessory or apparatus. Also, the above-described construction of the end terminal device of the present invention affords the possibility of preparing the cable end before the cable is laid, and of transporting the prepared cable to the place of installation without the risk of oil leakage or of oil pollution.

In accordance with another aspect of the present invention, the end terminal device may include a resilient contact element of the plug-and-socket-type which is connectable to a complementary contact element provided in the accessory or apparatus of the closed type. The end terminal device also includes valve means for establishing a fluid connection between the oil duct of the cable and the ambient surrounding the end terminal device, when the latter is positioned in the accessory or apparatus.

An end terminal device having these noted contact and valve structural features is particularly useful for facilitating a connection between a cable end and a transformer. In fact, in this case, the housing containing the transformer can be prearranged by the manufacturer of the transformer to contain a hollow insulator of conventional construction, tightly connected to the housing and projecting towards the inside of the housing. In this case, the insulator will have a contact element which is complementary to the plug-and-socket-type contact provided on the end terminal device of the cable and which is electrically connected to the transformer. Accordingly, with this arrangement, the transformer housing may be filled with insulating oil by the manufacturer, leaving the purchaser with the task of inserting a cable end, terminated with the above described end terminal device, into the insulator positioned in the transformer housing and, treating the resultant ambient between the insulator and the end terminal device.

Terminal devices for entry into transformers of a character above described are known. These terminal devices, however, also utilize an outer cover insulator constructed similar to the insulator connected in the housing of the transformer, and thus require two insulators, one in the terminal device for the cable end, and one within the transformer. The use of two insulators for establishing a connection between a cable end and a transformer is, of course, disadvantageous, both in regard to their overall dimensions and to their cost. Moreover, the manner in which the two insulators accomplish a connection between the cable end and a transformer does not take into account the possibility of placing the fluid duct of the cable in communication with the resultant ambient between the two insulators.

In accordance with another aspect of the present invention, there is provided an end terminal device for ends of oil-filled cables which is of a reduced size and easily assembled; which allows treatment of the resultant ambient between the end terminal device and the insulator of the accessory or apparatus; and which provides fluid communication between the fluid duct of the cable and the resultant ambient between the end terminal device and the insulator. To this end, the end terminal device constructed in accordance with the present invention includes first means enclosing portions of the cable end for preventing fluid leakage from portions thereof having exposed insulation, and second means covering the exposed fluid duct of the cable conductor for normally preventing fluid flow therefrom, and for allowing fluid flow therefrom when the end terminal device is substantially completely positioned within the accessory or apparatus of the closed type, such as the insulation housing in the transformer housing. Thus, with this arrangement, the fluid duct of the cable conductor is placed in fluid-flowing communication with the resultant ambient between the end terminal device and the accessory or apparatus of the closed type only when the end terminal device is completely positioned within the latter. In addition, closing means, cooperating with the accessory or apparatus of the closed type, are provided for sealing off the resultant ambient when the end terminal device is partially to fully positioned within the accessory or apparatus of the closed type.

In utilizing an end terminal device constructed in accordance with the present invention, the cable end is prepared by first removing a portion of the lead sheath which covers the cable insulation in order to bare the insulation, and then removing a portion of the insulation from the tip of the electric cable to bare the conductor end and expose the oil duct thereof. Thereafter, the prepared end of cable is terminated with an end terminal device constructed in accordance with the present invention.

The end terminal device may include tubular housing of mechanically resistant insulating material, such as, for example, epoxy resin, which is tightly connected at one end to an end clamp secured to the tip of the bared conductor and at the other end, to a funnel-shaped cap welded on the cable sheath. The clamp, tubular housing, and cap cooperatively define the above-mentioned means which prevent oil leakage from the bared insulation of the cable end.

In addition to the above, the tubular housing of insulating material preferably incorporates stress control electrodes, either at earth or at operating potential, which insure that the resultant electric field near the cable end is appropriately distributed.

In the preferred embodiment of the present invention, the mentioned second means which function to prevent oil spillage from the inner duct of the conductor until the terminated cable end is substantially completely inserted in the accessory or apparatus, are also utilized to place the oil duct of the cable in communication with the resultant ambient between the end terminal device and the inside of the accessory or insulator provided in an apparatus.

Preferably, the second means are constituted by a valve seat disposed in the end clamp and which controls oil flow in a passageway connecting the oil duct of the cable and the exterior of the end terminal device. The valve seat is normally biased closed, but is arranged to be opened when the cable end is substantially completely inserted in the accessory or apparatus. To this end, an axial opening defining the mentioned passageway is provided through the end clamp to the inner duct of the cable, and a housing containing the valve seat is inserted in the axial opening. The valve seat is preferably of the mushroom-type, and is constructed to open the opening to the fluid duct when moved towards the end clamp. The valve seat is maintained normally closed, however, by a spring contained in the housing and acting on the valve seat, itself. A valve stem, having longitudinally extending grooves, is connected to the valve seat and extends from the valve housing a sufficient length such that the complete positioning of the end terminal device within the accessory or apparatus moves the valve stem and seat to provide fluid communication between the oil duct and the ambient.

In order to insure that the valve means remain open after the terminated cable end has been completely inserted in the accessory or apparatus, the end terminal device must be constructed of mechanically rigid material to withstand the deformations of the conductor due to temperature variations. In this way, the distance between the end clamp and the funnel-shaped cap welded on the cable sheath, will remain constant; and the valve seat will remain open when the end terminal device is completely positioned within the accessory or apparatus. It is for this reason that both the tubular housing of insulating material, and the metallic tubing which surround the cable insulation between the end clamp and the funnel-shaped cap must be sufficiently mechanically resistant to withstand the stresses originated by the deformations of the conductor.

In accordance with another aspect of the present invention, the end terminal device includes flange means which seal off the resultant ambient between the accessory or apparatus of the closed type and the end terminal device when the end terminal device is partially to fully positioned within the accessory or apparatus. This arrangement allows treatment of the resultant ambient so that the air and moisture therein may be exhausted and filled with insulating fluid.

In the preferred embodiment the flange means includes a circumferential flange about the funnel-shaped cap of the end terminal device. The flange is arranged to engage an outer peripheral edge of the accessory or apparatus of the closed type when the end terminal device is partially positioned within the accessory or apparatus thereby sealing the resultant ambient therebetween. A circumferential groove may be defined in the flange and arranged to receive elastic packing. This described sealing arrangement permits a tight slideable connection between the contacting surfaces of the flange and the peripheral edge of the accessory or apparatus.

Thus, when the end terminal device is only partially inserted in the accessory or apparatus, the resultant ambient between the end terminal device and the inside of the accessory or apparatus is tightly sealed. Also, when the end terminal device is partially positioned, the valve housing near the end clamp remains closed, thus preventing spillage of the oil from the oil duct from the cable conductor during subsequent treatment of the resultant ambient.

A port and regulated valve therefor may be provided in the end terminal device and arranged to communicate with the resultant ambient and permit the above-discussed treatment of the resultant ambient. Thus, the resultant ambient may be evacuated and filled with insulating fluid via the port by means of an auxiliary tank or the like. Thereafter, the end terminal device may be completely inserted into the accessory or apparatus, thus placing the resultant ambient in communication with the fluid duct of the cable.

In accordance with another aspect of the present invention, there is provided a method of inserting a self-contained fluid-filled electric cable into an accessory or apparatus of the closed type. As described above, the cable end is first partially inserted into the accessory or apparatus of the closed type, while simultaneously sealing the resultant ambient between the accessory or apparatus of the closed type and the cable end. Thereafter the air and moisture of the resultant ambient is evacuated and replaced with insulating fluid. Then the cable end is completely inserted into the accessory or apparatus of the closed type, and the fluid duct of the electric cable is placed in communication with the resultant ambient.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may be readily utilized for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description and is shown in the accompanying drawings wherein:

FIG. 2 is an enlarged detail view of portions of FIG. 1, showing the structural components of the valve means thereof; and FIG. 3 is an enlarged detail view of portions of FIG. 1, showing the juncture of the end terminal device to the housing of the transformer.

Figure 1:
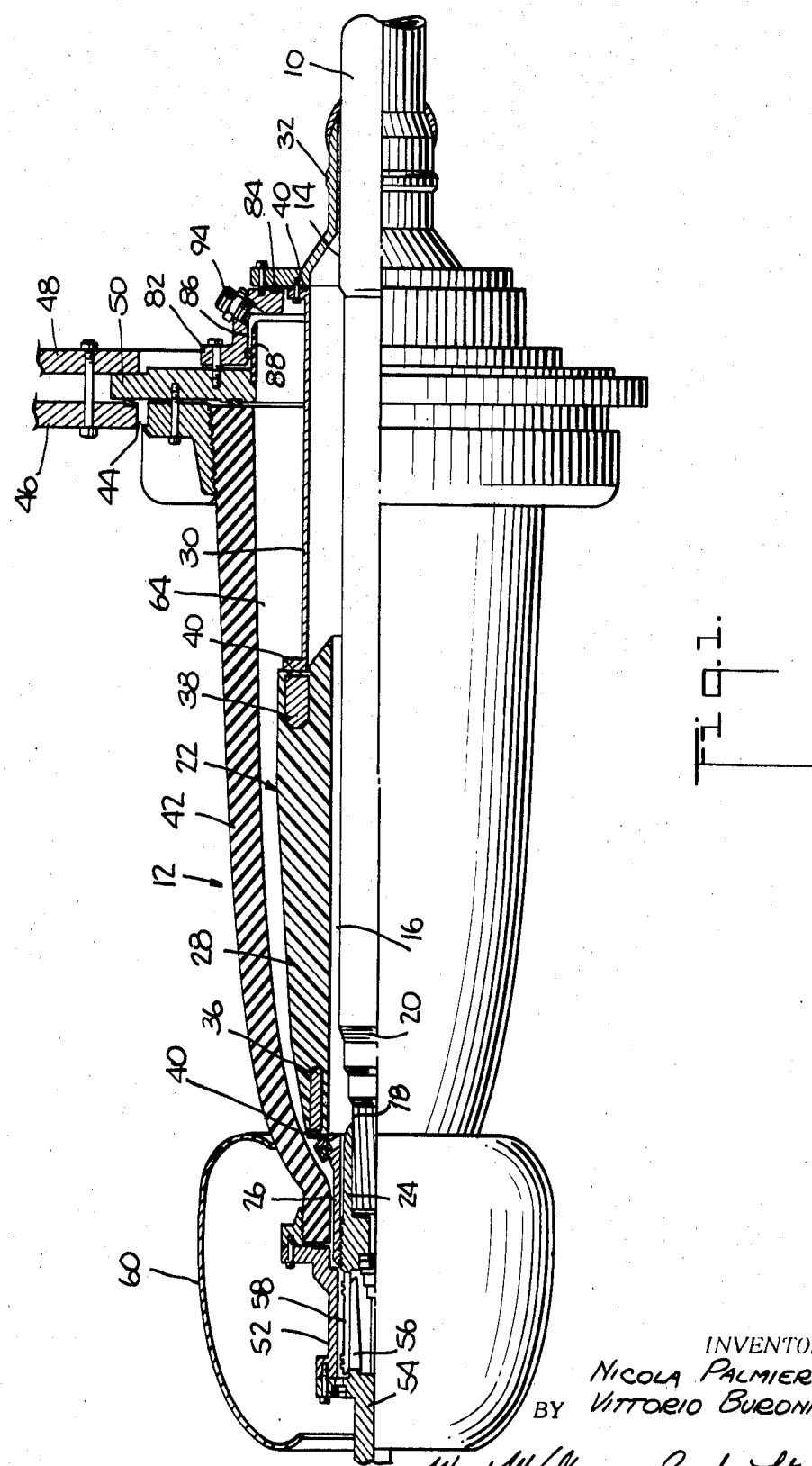
FIG. 1 shows a cable end terminated with an end terminal device constructed in accordance with the present invention and positioned within a transformer housing.

Referring now to the drawings in detail, and specifically to FIG. 1, there is shown a cable end, shown generally at 10, which is terminated by an end terminal device 12 constructed in accordance with the present invention. As best shown in FIGS. 1 and 2, the cable end 10 has been prepared in a conventional manner by removing its outer sheath 14 from the cable end 10, thus baring paper insulation 16. The paper insulation 16 has, in turn, been removed to bare a terminal portion of the conductor 18 of the cable.

In order to prevent leakage of oil which percolates through the bare insulation 16, for example as at 20, the end terminal device 12 includes sealing means, shown generally at 22. As shown in FIG. 1 the sealing means 22 comprises a metallic clamp 24, a metallic coupling element 26 screwed to the clamp 24, and a tubular housing 28 of insulating material which is tightly connected at one end to the coupling element 26, and at the other end through metallic tubing 30 to a funnel-shaped cap 32, which is connected to the cable sheath as at 34 (FIG. 3) in any well-known manner, such as by welding.

As shown in FIG. 1 the tubular housing 28 has stress control electrodes 36 and 38 embedded therein, and which are maintained, respectively, at earth and operating potential in order to insure the desired distribution of electric field near the end of the cable. The tubular housing 28, the coupling element 26, the metallic tubing 30 and the cap 32 are preferably connected together by fastening means, such as screws; and an oiltight seal is maintained at their junctures by elastic packing 40.

The end terminal device is shown in FIGS. 1 and 3 as being fully positioned in a bushing insulator 42 which is secured in an opening 44 in a transformer housing 46. The insulator 42 is fixedly positioned in the opening by circumferential clamp 48 which engages the extremities of an outwardly extending lip 50 mechanically secured to the insulator 42. As shown in FIGS. 1 and 2, the insulator 42 projects inside the transformer housing 46 and is tightly connected therein, through a metallic coupling element 52, to a fixed electric contact 54 defining a flexible electrical connection to the transformer (not shown). A plug-and-socket contact 56 is provided on the fixed contact element 54 which faces the inside of the insulator 42, and which is arranged to engage a complementary socket contact 58 integrally formed on the end clamp 24. Electrical screening may be provided for the fixed contact 54, such as by a metallic cap 60 (FIG. 1).

As best shown in FIG. 2, valve means shown generally at 62, are provided in the end terminal device 12 for preventing oil flow from the inner duct of the cable conductor until the end terminal device 12 is completely inserted in the insulator 42. The valve means 62 thus also function to place the fluid duct of the cable into fluid communication with a resultant ambient 64 defined between the end terminal device 12 and the insulator 42. To this end, an axial opening 66 is provided in the end clamp 24 and a valve housing 68 is secured thereto, such as by threads 70. The valve housing 68 contains a valve seat 72 having a frustoconical end portion 74 and a valve stem 76. The valve stem 76 includes longitudinally extending grooves 78 which extend along its longitudinal length. The valve seat 72 is normally kept closed by bias spring 80 acting on the end portion 74 of the valve seat 72. The length of the valve stem 76 is such, however, that by completely inserting the end terminal device 12 into the insulator 42, the valve stem 76 leans on the body of the fixed contact element 54 to move the valve seat 72 and place the oil duct of the conductor into communication with the resultant ambient 64.

As stated above, the end terminal device 12 is arranged to maintain the resultant ambient 64 tightly closed while the end terminal device is partially to fully inserted in the insulator 42. With this arrangement, the resultant ambient 64 may be evacuated and filled with insulating oil while the end terminal device is partially positioned in the insulator 42 and while there is no fluid communication between the resultant ambient and the fluid duct of the cable end.

For its purpose, a circumferential flange 82 (FIGS. 1 and 3) is tightly connected to the funnel-shaped cap 32 by suitable fastening means and packing 84. The flange 82 has s substantially cylindrical face 86 which engages a circumferential edge 88 projecting from lip 50. In addition, circumferential groove 90 carrying elastic packing 92 is provided about the contacting face of the flange 82. The packing 90 assures a slideable sealing connection between the edge 88 and the flange 82.

A port and valve arrangement 94 is resultant in the flange 82 for facilitating treatment of the resultant ambient 64, and allowing easy access to the resultant ambient 64. Thus, by operating the port and valve arrangement 94, when the end terminal device 12 is partially inserted within the insulator 42, the resultant ambient 64 may be evacuated and filled with insulating fluid, while maintaining a sealed resultant ambient and preventing fluid flow between the fluid duct in the cable end and the resultant ambient.

We claim:

1. An end terminal device for entry into an accessory or apparatus of the closed type and for terminating the end of a fluid filled electric cable having an exposed fluid duct therein, said end terminal device comprising first means covering said exposed fluid duct for normally preventing fluid flow through said terminal device and for preventing fluid flow therethrough when said end terminal device is partially positioned within said accessory or apparatus but operable by the positioning of said end terminal device as it is substantially completely positioned within said accessory or apparatus for allowing fluid flow therethrough when said end terminal device is substantially completely positioned within said accessory or apparatus of the closed type, and closing means cooperating with said accessory or apparatus of the closed type and extending between said accessory or apparatus and said terminal device for sealing off the resultant ambient between said accessory or apparatus of the closed type and said end terminal device both when said end terminal device is only partially positioned within, and when said end terminal device is completely positioned within said accessory or apparatus of the closed type whereby said resultant ambient is sealed and may be treated with said end terminal partially positioned while preventing fluid flow through said fluid duct of said cable.

2. An end terminal device for entry into an accessory or apparatus of the closed type for the prepared end of a fluid filled electric cable having a fluid duct therein and covered with insulation and an outer sheath, the prepared end of said cable having portions with bared conductor exposing said fluid duct and with bared insulation, said end terminal device comprising first means enclosing portions of said prepared end for preventing fluid leakage from said portions having exposed insulation, second means covering said exposed fluid duct for normally preventing fluid flow therethrough and for preventing fluid flow therethrough when said end terminal device is partially positioned within said accessory or apparatus but operable by the positioning of said end terminal device as it is substantially completely positioned within said accessory or apparatus, for allowing fluid flow therethrough when said end terminal device is substantially completely positioned within said accessory or apparatus of the closed type whereby said fluid duct is placed in fluid communication with the resultant ambient between said end terminal device and said accessory or apparatus of the closed type when said end terminal device is substantially completely positioned within said accessory or apparatus, and closing means cooperating with said accessory or apparatus of the closed type and extending between said accessory or apparatus and said terminal device for sealing off said resultant ambient both when said end terminal device is only partially positioned within, and when said end terminal device is completely positioned within said accessory or apparatus of the closed type.

3. An end terminal device as in claim 2 wherein said first means defines portions of an outer housing for said end terminal device along the length of said prepared end of cable, and is relatively constructed with said accessory or apparatus of the closed type to define said ambient therebetween.

4. An end terminal device as in claim 3 wherein said first means includes end clamp means secured in fluidtight relation to the conductor at the tip of said cable, cap means secured in fluidtight relation to said sheath of said cable, and an insulating means surrounding said prepared end of cable and connected in fluidtight relation to said end clamp means and said cap means.

5. An end terminal device as in claim 4 wherein said insulating means is connected to said cap means through metallic rigid tubing which surrounds portions of said prepared end of said cable.

6. An end terminal device as in claim 4 wherein said insulating means comprises epoxy resin tubing.

7. An end terminal device for entry into an accessory or apparatus of the closed type for the prepared end of a fluid-filled electric cable having a fluid duct therein and covered with insulation and an outer sheath, the prepared end of said cable having portions with bared conductor exposing said fluid duct and with bared insulation, said end terminal device comprising first means enclosing portions of said prepared end for preventing fluid leakage from said portions having exposed insulation, second means covering said exposed fluid duct for normally preventing fluid flow therethrough, and for allowing fluid flow therethrough when said end terminal device is substantially completely positioned within said accessory or apparatus of the closed type whereby said fluid duct is placed in fluid communication with the resultant ambient between said end terminal device and said accessory or apparatus of the closed type, said second means including valve means connecting said fluid duct with said ambient, said valve means being normally resiliently maintained in the closed position and being arranged to cooperate with said accessory or apparatus of the closed type and open when said end terminal is substantially completely positioned within said accessory or apparatus of the closed type, and closing means cooperating with said accessory or apparatus of the closed type for sealing off said resultant ambient when said end terminal device is partially to fully positioned within said accessory or apparatus of the closed type.

8. An end terminal device as in claim 7 wherein said valve means includes housing means adjacent said fluid duct, said housing having an axial opening extending from said fluid duct to said accessory or apparatus of the closed type, a valve seat positioned at said opening and constructed to close same, said valve seat having a stem extending through said opening in said housing and being normally resiliently biased to close said opening in said housing, said valve stem being relatively constructed to cooperate with said accessory or apparatus of the closed type and relatively moved thereby when said end terminal device is substantially completely positioned in said accessory or apparatus of the closed type whereby said valve seat is positioned to provide fluid communication between said fluid duct and said resultant ambient.

9. An end terminal device as in claim 8 wherein said valve stem extends from said housing and is of a length to bear against and forced by a fixed contact provided inside the accessory or apparatus of the closed type.

10. An end terminal device for entry into an accessory or apparatus of the closed type for the prepared end of a fluid-filled electric cable having a fluid duct therein and covered with insulation and an outer sheath, the prepared end of said cable having portions with bared conductor exposing said fluid duct and with bared insulation, said end terminal device comprising first means enclosing portions of said prepared end for preventing fluid leakage from said portions having exposed insulation, second means covering said exposed fluid duct for normally preventing fluid flow therethrough, and for allowing fluid flow therethrough when said end terminal device is substantially completely positioned within said accessory or apparatus of the closed type whereby said fluid duct is placed in fluid communication with the resultant ambient between said end terminal device and said accessory or apparatus of the closed type, and closing means cooperating with said accessory or apparatus of the closed type for sealing off said resultant ambient when said end terminal device is partially to fully positioned within said accessory or apparatus of the closed type said closing means including flange means about said cable end and arranged to engage the outer peripheral edge of said accessory or apparatus of the closed type when said end terminal device is partially positioned within said accessory or apparatus of the closed type thereby sealing said resultant ambient therebetween.

11. An end terminal device as in claim 10 wherein a groove is defined in the contacting surface of said flange and elastic packing is provided therein.

12. An end terminal device as in claim 10 wherein an ambient exhaust port is provided in said flange.

13. An end terminal device for use in combination with an accessory or apparatus of the closed type and for terminating end of oil-filled electric cable having an oil duct therein and covered with insulation and an outer sheath, the said end of cable having its tip bared to expose said conductor and oil duct and having adjacent portions with bared insulation, said end terminal device comprising a clamp positioned on said bared tip of cable, a funnel-shaped cap about said cable and secured to said sheath, a cylindrical housing secured to and extending between clamp and cap, said clamp, cap and housing being constructed and arranged to enclose at least the portions of said cable end having bared insulation and prevent oil leakage therefrom; an opening in said clamp and arranged to provide oil communication between said oil duct and the resultant ambient between said end terminal device and said accessory or apparatus of the closed type; valve means arranged adjacent said opening and constructed to normally prevent oil flow therethrough, said valve means including means for allowing fluid flow in said opening when said end terminal device is substantially completely inserted in said accessory or apparatus of the closed type whereby said oil duct of said electric cable is placed in fluid communication with said resultant ambient when said end terminal device is substantially completely inserted in said accessory or apparatus of the closed type; and a sealing flange provided adjacent said cap and cooperating with said accessory or apparatus of the closed type for sealing off said resultant ambient when said end terminal device is partially to fully positioned within said accessory or apparatus of the closed type.

14. An end terminal device as in claim 13 wherein said clamp, cap and insulating housing are arranged to define the outer housing of said end terminal device and are relatively constructed to define said resultant ambient between end terminal device and said accessory or apparatus of the closed type.

15. An end terminal device as in claim 14 wherein said tubular housing comprises insulating material and is connected to said cap through metallic, rigid tubing which surrounds said cable and is secured to said cap.

16. An end terminal device as in claim 13 wherein said valve means includes a valve seat positioned at said opening into said clamp means and constructed to close same, said valve seat having a stem extending through said opening, and normally resiliently biased to close said opening, said valve stem being relatively constructed to cooperate with said accessory or apparatus of the closed type and to be relatively moved thereby when said end terminal device is substantially completely positioned in said accessory or apparatus of the closed type whereby said valve seat is also positioned to provide fluid communication between said fluid duct and said ambient.

17. An end terminal device as in claim 13 wherein a groove is defined in the accessory or apparatus of the closed type contacting surface of said flange and elastic packing is provided therein.

18. An end terminal device as in claim 13 wherein a port is provided to treat the resultant sealed ambient between said accessory or apparatus of the closed type and said end terminal device.

19. A method of inserting a self-contained fluid-filled electric end cable into an accessory or apparatus of the closed type comprising partially inserting said cable end into the accessory or apparatus of the closed type, simultaneously sealing the resultant ambient between said accessory or apparatus of the closed type and said cable end, evacuating air contained in said resultant ambient, filling said resultant ambient with insulating fluid, and then completely inserting said cable end in said accessory or apparatus of the closed type and placing the fluid of said cable end in fluid communication with said resultant ambient.

20. A method of inserting a self-contained oil-filled electric cable having an oil duct defined therein, into an accessory or apparatus of the closed type comprising partially inserting said cable end into the accessory or apparatus of the closed type, simultaneously sealing the resultant ambient between said accessory or apparatus of the closed type; evacuating the air and moisture within the resultant ambient and filling same with insulating oil at a predetermined pressure; and then completely inserting the cable end into said accessory or apparatus of the closed type and placing the oil duct thereof in fluid communication with said ambient.